(12) United States Patent
Irish

(10) Patent No.: US 9,753,714 B1
(45) Date of Patent: Sep. 5, 2017

(54) SOFTWARE PACKAGE MANAGEMENT SYSTEMS INCLUDING MULTIPLE MODULES FOR SUPPORTING MULTIPLE SOFTWARE PACKAGE TYPES

(71) Applicant: CA, Inc., Islandia, NY (US)

(72) Inventor: Liam Irish, Tampa, FL (US)

(73) Assignee: CA, INC., Islandia, NY (US)

( * ) Notice: Subject to any disclaimer, the term of this patent is extended or adjusted under 35 U.S.C. 154(b) by 510 days.

(21) Appl. No.: 13/797,403

(22) Filed: Mar. 12, 2013

(51) Int. Cl.
*G06F 9/445* (2006.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| | | | | |
|---|---|---|---|---|
| 8,527,979 B2* | 9/2013 | Wookey | | 717/169 |
| 2010/0318984 A1* | 12/2010 | Araki | | 717/174 |
| 2013/0263088 A1* | 10/2013 | Hoff | | G06F 9/45529 |
| | | | | 717/121 |
| 2013/0275429 A1* | 10/2013 | York et al. | | 707/737 |

* cited by examiner

*Primary Examiner* — Chuck Kendall
(74) *Attorney, Agent, or Firm* — Sage Patent Group

(57) ABSTRACT

A method includes comparing a type associated with a software package including a plurality of files with a plurality of plugin types that are associated with a plurality of plugin modules, selecting one of the plurality of plugin types that supports the software package, and performing an action on the software package using the one of the plurality of plugin modules associated with the selected one of the plurality of plugin types.

17 Claims, 5 Drawing Sheets

| Package Plugin Type | Action | | | | | |
|---|---|---|---|---|---|---|
| | identify | install | remove | authenticate | audit | list |
| gem | X | | | | | |
| tgz | X | X | X | | | X |
| dpkg | X | X | X | X | | X |
| rpm | X | X | X | X | X | X |
| apk | X | | | | | X |
| zip | X | | | | | X |

FIG. 5

SOFTWARE PACKAGE MANAGEMENT SYSTEMS INCLUDING MULTIPLE MODULES FOR SUPPORTING MULTIPLE SOFTWARE PACKAGE TYPES

BACKGROUND

The present disclosure relates to computing systems, and, in particular, to package management systems for managing software on a computer system.

A package management system is a set of software tools that are used to automate the process of maintaining software on a data processing system. For example, a package management system may automate such functions as installing, upgrading, configuring and removing software packages in a consistent manner. A software package is a distribution of software, applications, and/or data. Software packages may also include metadata, which may include name(s) for the contents of the package, description(s) of the various files, version number(s), vendor identification information, checksum(s), and/or dependency information for the software to run properly.

Current package management systems typically support a single package format. If they allow the importation of foreign packages, it is typically by converting them to their own format. While older, manual methods of software installation may still be available where an administrator runs an installer directly, which compiles a package or injects pre-compiled code into the system, such an approach bypasses the centralized control of using a package management system to administer and maintain the software on the data processing system.

SUMMARY

In some embodiments of the inventive subject matter, a method comprises comparing a type associated with a software package comprising a plurality of files with a plurality of plugin types that are associated with a plurality of plugin modules, selecting one of the plurality of plugin types that supports the software package, and performing an action on the software package using the one of the plurality of plugin modules associated with the selected one of the plurality of plugin types.

In other embodiments, the plugin types are ranked in an order of preference. Selecting one of the plurality of plugin types comprises determining that multiple ones of the plurality of plugin types support the software package and selecting the one of the plurality of plugin types from the multiple ones of the plurality of plugin types that support the software package that has a highest rank in the order of preference.

In still other embodiments, selecting one of the plurality of plugin types comprises determining that multiple ones of the plurality of plugin types support the software package and receiving user input identifying the selected one of the plurality of plugin types from the multiple ones of the plurality of plugin types that support the software package.

In still other embodiments, performing the action comprises receiving user input requesting that the action be performed, and performing the action on the software package responsive to a determination that the one of the plurality of plugin modules associated with the selected one of the plurality of plugin types supports the action.

In still other embodiments, the action is a first action and the method further comprises receiving user input requesting that a second action be performed, and generating an error notification responsive to a determination that the one of the plurality of plugin modules associated with the selected one of the plurality of plugin types does not support the second action.

In still other embodiments, performing the action comprises generating a parameter list identifying a parameter for performing the action, and performing the action responsive to a receipt of the parameter.

In still other embodiments, the parameter list identifies a plurality of parameters.

In still other embodiments, the plurality of parameters comprises one of an account number, an identification of an authority contact, and a file that the software package is dependent on.

In still other embodiments, performing the action comprises generating one of an error notification responsive to a determination that the parameter is incorrect and missing.

In still other embodiments, the action is one of an identify operation, an install operation, a remove operation, an authenticate operation, an audit operation, and a list operation.

In further embodiments of the inventive subject matter, a system comprises a processor and a memory coupled to the processor. The memory comprises computer readable program code embodied in the memory that when executed by the processor causes the processor to perform operations comprising: comparing a type associated with a software package comprising a plurality of files with a plurality of plugin types that are associated with a plurality of plugin modules, selecting one of the plurality of plugin types that supports the software package, and performing an action on the software package using the one of the plurality of plugin modules associated with the selected one of the plurality of plugin types.

In still further embodiments, the plugin types are ranked in an order of preference and selecting one of the plurality of plugin types comprises determining that multiple ones of the plurality of plugin types support the software package and selecting the one of the plurality of plugin types from the multiple ones of the plurality of plugin types that support the software package that has a highest rank in the order of preference.

In still further embodiments, selecting one of the plurality of plugin types comprises determining that multiple ones of the plurality of plugin types support the software package and receiving user input identifying the selected one of the plurality of plugin types from the multiple ones of the plurality of plugin types that support the software package.

In still further embodiments, performing the action comprises receiving user input requesting that the action be performed, and performing the action on the software package responsive to a determination that the one of the plurality of plugin modules associated with the selected one of the plurality of plugin types supports the action.

In still further embodiments, performing the action comprises generating a parameter list identifying a parameter for performing the action, and performing the action responsive to a receipt of the parameter.

In other embodiments of the inventive subject matter, a computer program product comprises a tangible computer readable storage medium comprising computer readable program code embodied in the medium that when executed by a processor causes the processor to perform operations comprising: comparing a type associated with a software package comprising a plurality of files with a plurality of plugin types that are associated with a plurality of plugin modules, selecting one of the plurality of plugin types that supports the software package, and performing an action on the software package using the one of the plurality of plugin modules associated with the selected one of the plurality of plugin types.

In still other embodiments of the inventive subject matter, the plugin types are ranked in an order of preference and selecting one of the plurality of plugin types comprises: determining that multiple ones of the plurality of plugin types support the software package and selecting the one of the plurality of plugin types from the multiple ones of the plurality of plugin types that support the software package that has a highest rank in the order of preference.

In still other embodiments of the inventive subject matter, selecting one of the plurality of plugin types comprises determining that multiple ones of the plurality of plugin types support the software package and receiving user input identifying the selected one of the plurality of plugin types from the multiple ones of the plurality of plugin types that support the software package.

In still other embodiments of the inventive subject matter, performing the action comprises receiving user input requesting that the action be performed, and performing the action on the software package responsive to a determination that the one of the plurality of plugin modules associated with the selected one of the plurality of plugin types supports the action.

In still other embodiments of the inventive subject matter, performing the action comprises: generating a parameter list identifying a parameter for performing the action, and performing the action responsive to a receipt of the parameter.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which:

FIG. 5 is a table that illustrates operations of a package management system in accordance with some embodiments of the present inventive subject matter.

DETAILED DESCRIPTION

Figure 1:
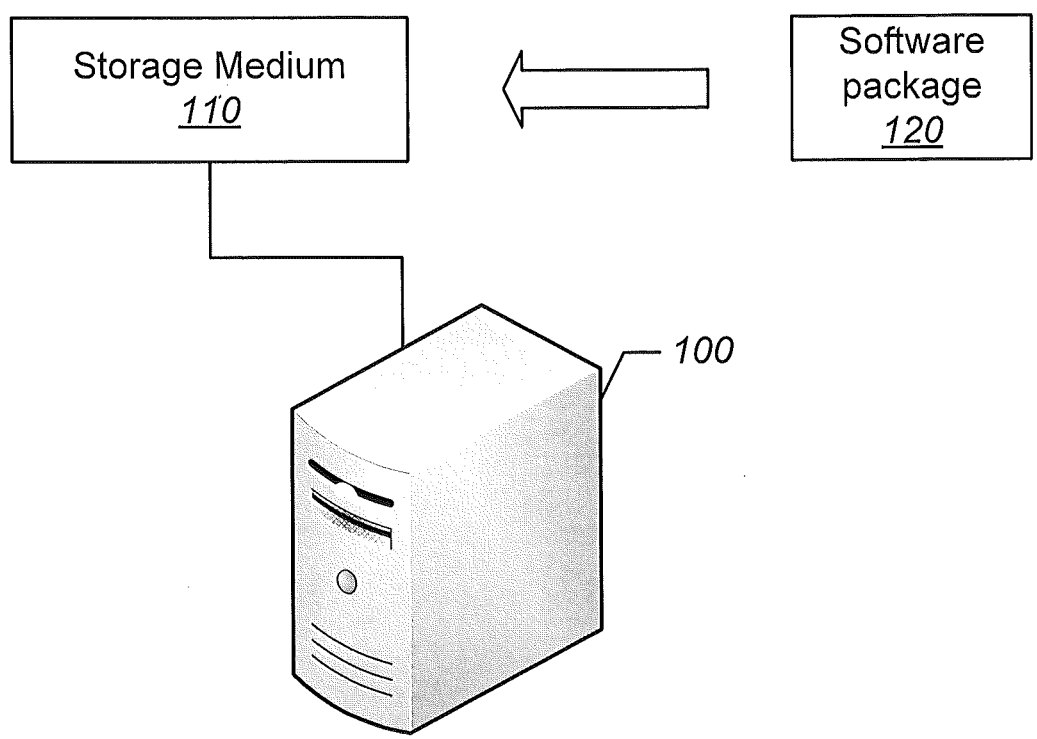
FIG. 1 is a block diagram of a software environment including a data processing system with a package management system in accordance with some embodiments of the present inventive subject matter.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, a "software package" is a software component that a package management system can install on a data processing system. The package management system may also perform other actions or operations on the software package, such as, but not limited to, an identify operation, a remove operation, an authenticate operation, an audit operation, and a list operation. A software package may include, but is not limited to, software application files, data files, and metadata.

Some embodiments of the inventive subject matter stem from a realization that software environments are requiring more from their package management systems. Software packages may include such features as authentication and the ability to purchase the package. Administrators of software environments typically still need the ability to control the installation and removal of software on the data processing systems they administer and they may also need to verify the originators of software they install, perform audits on the software and the like. Package management systems that support the administration of a single package type may be sufficient if all the software to be installed on a data processing system is packaged using the same package type or format. Supporting only a single package format, however, may limit the availability of certain software on a data processing system and may also tempt administrators and users to install software of other package types by bypassing or circumventing the package management system for the data processing system. While it may be possible to convert an unsupported package type to the package type that the package management system supports, the conversion may introduce installation errors and may result in the loss of certain capabilities, such as the ability to authenticate the originator of the software.

Embodiments according to the inventive subject matter may provide a modular package management system in which a core component of the package management system may provide general software administration and maintenance capabilities while individual plugin components of the package management system are tailored for managing specific software package types or formats. Plugin components may be added to the package management system to support a desired software package type or removed from the package management system if there is no need to support a certain software package type. As a result, multiple software package types can be supported using a single package management system, which may provide a single point of visibility, accountability, and control.

Referring to FIG. 1, a software environment, in accordance with some embodiments of the inventive subject matter, comprises a data processing system 100 that includes a storage medium 110. The data processing system 100 may be a single computer system, may represent multiple computer systems, or a network of computer systems. The computer systems may be co-located in a server farm, for example, or may be located in different geographic regions. The storage medium 110 may represent the one or more computer readable media that the data processing system 110 uses to storage software and data. The storage medium may comprise any type of computer readable media including, but not limited to, a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. The data processing system 100 may include a package management system, according to some embodiments of the inventive subject matter, that can be used to install and maintain the software package 120.

Although FIG. 1 illustrates an exemplary software environment, it will be understood that the present invention is not limited to such configurations, but is intended to encompass any configuration capable of carrying out the operations described herein.

Figure 2:
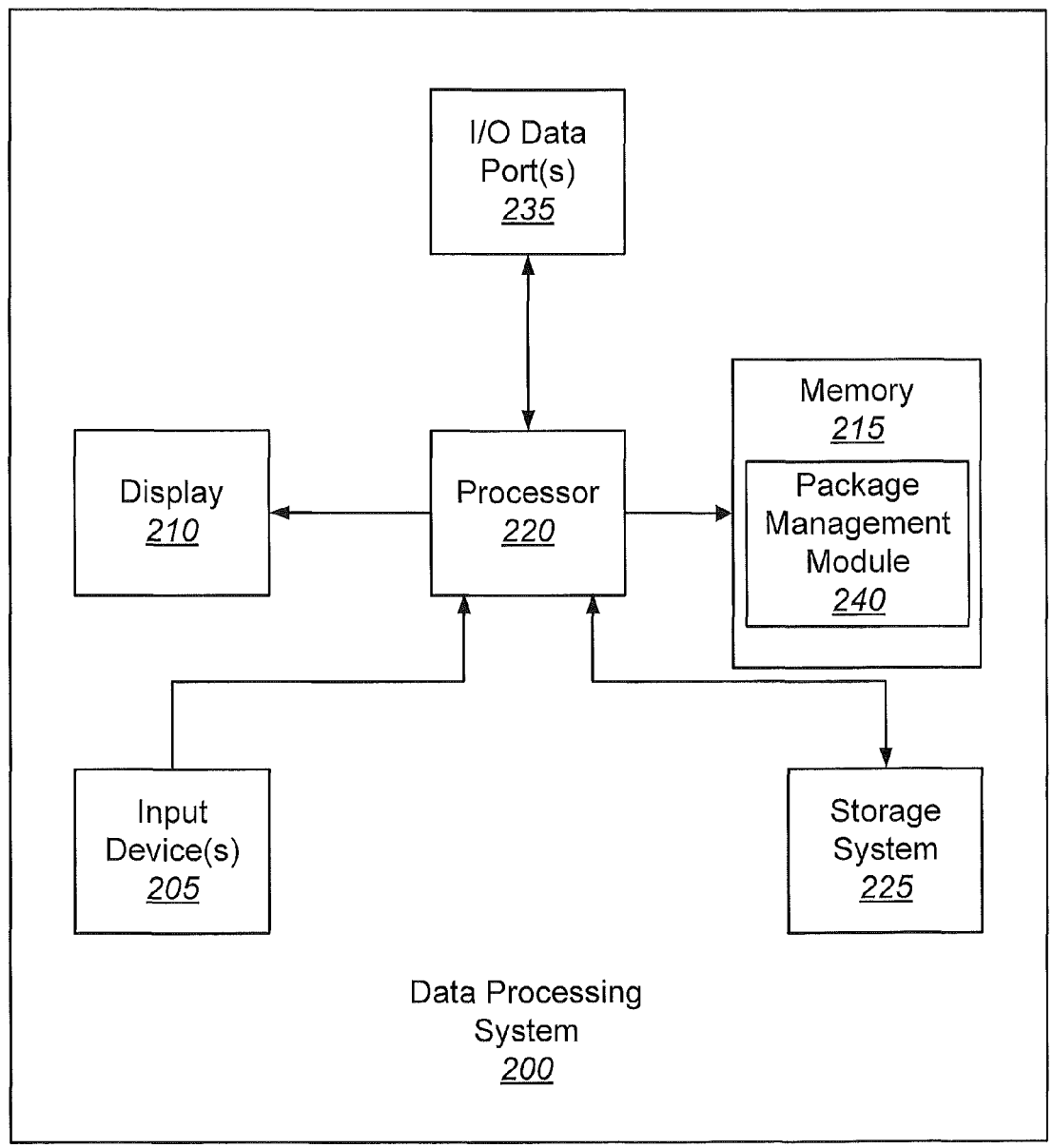
FIG. 2 is a block diagram that illustrates a data processing system including a package management module in accordance with some embodiments of the present inventive subject matter.

FIG. 2 illustrates a data processing system 200 that may be used, for example, to implement the data processing system 100 of FIG. 1 and may include a module software package management, in accordance with some embodiments of the inventive subject matter. The data processing system 200 comprises input device(s) 205, such as a keyboard or keypad, a display 210, and a memory 215 that communicate with a processor 220. The data processing system 200 may further comprise a storage system 225, and an I/O data port(s) 235 that also communicate with the processor 220. The storage system 225 may include removable and/or fixed media, such as floppy disks, ZIP drives, hard disks, or the like as well as virtual storage such as a RAMDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 215 may be configured with a package management system module 240 that may be used to provision and/or manage software package(s) on the data processing system 200.

Figure 3:
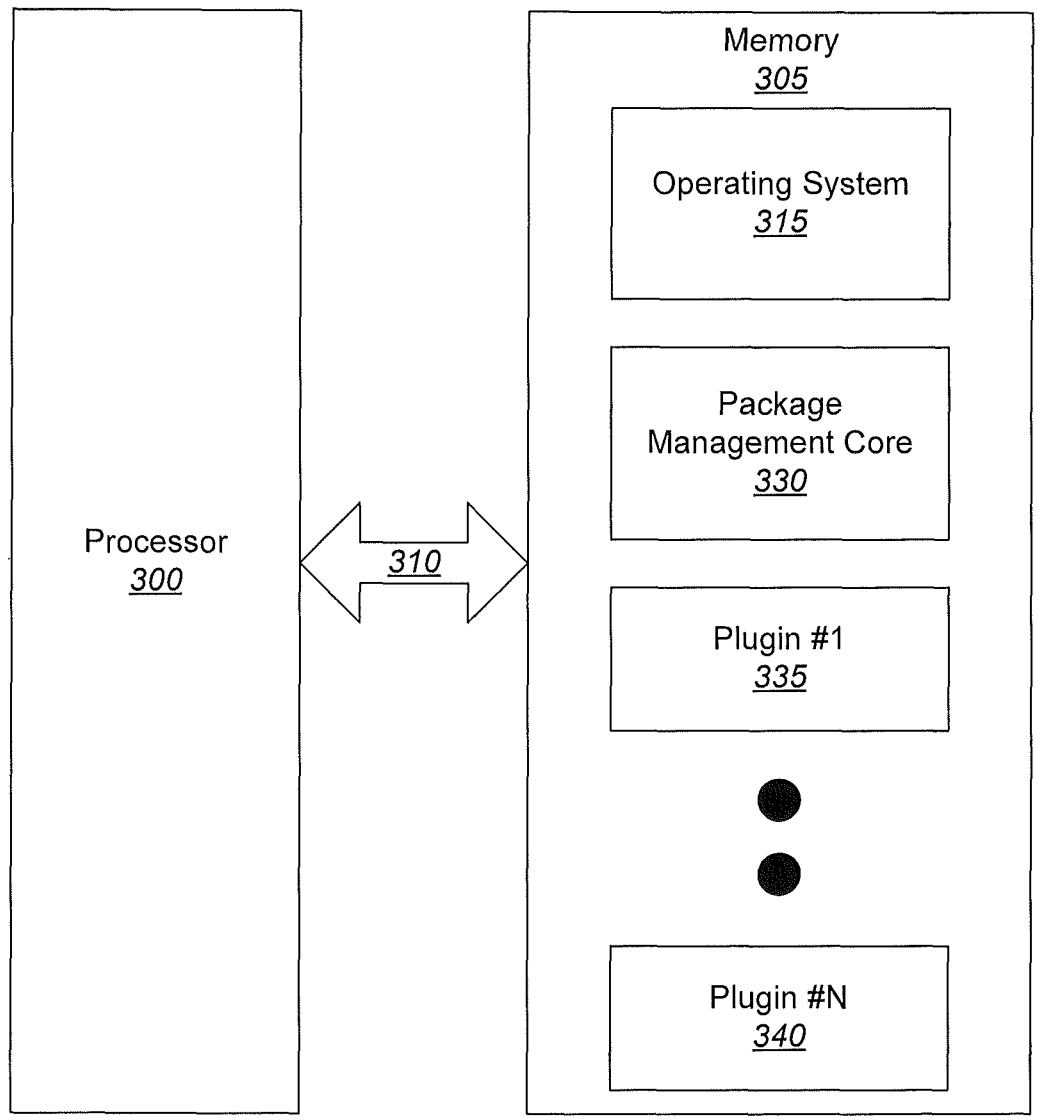
FIG. 3 is a block diagram that illustrates a software/hardware architecture for a package management system in a data processing system in accordance with some embodiments of the present inventive subject matter.

FIG. 3 illustrates a processor 300 and memory 305 that may be used in embodiments of data processing systems, such as the data processing system 200 of FIG. 2, for provisioning and/or managing software through a package management system in accordance with some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used to provision software in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to three or more categories of software and/or data: an operating system 315, a package management system core 330, and one or more plugin modules or components 335, . . . 340. The package management system core 330 along with the one or more plugin modules 335, . . . 340 may comprise a package management system. The operating system 315 generally controls the operation of the data processing system. In particular, the operating system 315 may manage the data processing system's software and/or hardware resources and may coordinate execution of programs by the processor 300. The package management core module 330 may provide general software administration and maintenance capabilities for a software package. The plugin modules or components 335, . . . 340 may be associated with specific software package file types or formats and, in combination with the package management core module 330, may support various actions or operations on software packages having types or formats that the respective plugin modules 335, . . . 340 support. Each of the plugin modules 335, . . . 340 may be tailored to a specific software package type or format. In some embodiments, a plugin module may support actions or operations on multiple types software packages. Plugin modules or components may be added to the package management system to support a desired software package type or removed from the package management system if there is no need to support a certain software package type.

Although FIG. 3 illustrates exemplary hardware/software architectures that may be used in data processing systems, such as the data processing system 200 of FIG. 2, for provisioning software, it will be understood that the present invention is not limited to such a configuration but is intended to encompass any configuration capable of carrying out operations described herein. Moreover, the functionality of the data processing system 200 of FIG. 2 and the hardware/software architecture of FIG. 3 may be implemented as a single processor system, a multi-processor system, or even a network of stand-alone computer systems, in accordance with various embodiments.

Computer program code for carrying out operations of data processing systems discussed above with respect to FIG. 3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 4:
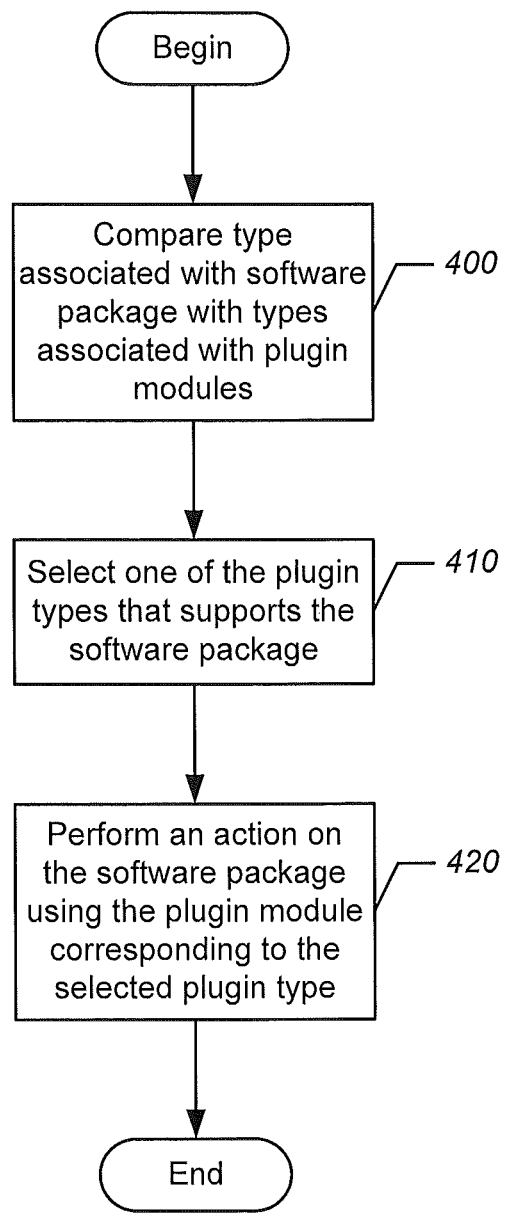
FIG. 4 is a flowchart that illustrates operations of a package management system in accordance with some embodiments of the present inventive subject matter.

Operations of a package management system according to some embodiments of the inventive subject matter will now be described with to the flow chart of FIG. 4 and the plugin module action table of FIG. 5. Referring now to FIG. 4, operations begin at block 400 where the package management core module 330 receives a software packages and compares a type associated with the software package with the various plugin types associated with the plugin modules 335, . . . 340. As shown in FIGS. 3 and 5, there may be numerous plugin modules for supporting a variety of software package types or formats. FIG. 5 illustrates plugin modules corresponding to six different plugin types or formats: gem, tgz, dpkg, rpm, apk, and zip. As described above, the number of plugin modules can vary depending on the number of software package types to be supported on the data processing system. Based on the comparison, the package management core module 330 selects one of the plugin types that supports the software package at block 410.

In some embodiments of the inventive concept, there may be just one plugin type that supports the software package. In other embodiments, multiple plugin types may support the software package. When multiple plugin types support the software package, the package management core module 330 may present an administrator or user with the list of plugin types that support the software package and allow the administrator or user to provide input to choose one of the plugin types. In other embodiments, an administrator or user may rank the plugin types in order of preference and the package management core module 330 may select the plugin type having the highest preference ranking that supports the software package.

At block 420, the plugin module 335, . . . 340 corresponding to the selected plugin type is used to perform an action or operation on the software package. As shown in FIG. 5, a variety of different types of actions or operations may be supported, including, but not limited to, an identify operation, an install operation, a remove operation, an authenticate operation, an audit operation, and a list operation. Moreover, each plugin type may not necessarily support every operation. As shown in FIG. 5, the plugin module associated with the rpm package type or format supports all of the foregoing actions or operations, while the plugin module associated with the gem package type or format only supports the identify action or operation. The identify operation verifies the software package type to ensure that the package type or format matches the file extension used to name the software package. The install operation installs some or all of the components of the software package on the data processing system. The remove operation removes some or all of the components of the software package from the data processing system. The authenticate operation verifies the source of the software package. The audit operation performs checks on the software package, such as checksums, checks for viruses, and the like. The list operation provides a listing of the components comprising the software package.

In some embodiments of the inventive concept, the action may be performed on the software package responsive to receiving input from an administrator or user. The administrator or user may request one or more of the actions or operations to be performed on the software package. The plugin module 335, . . . 340 determines whether the action or operation is supported and, if the action or operation is supported, the action or operation is performed. For example, if the software package is a tgz type package, the plugin module associated with the tgz type or format supports the identify, install, and remove actions or operations. If an administrator or user requested that the identify, install, and/or remove actions or operations be performed, then the requested action or operation would be performed. If, however, an administrator or user requested that the authenticate action or operation be carried out, then an error notification would be generated to notify the administrator or user that the plugin module 335, . . . 340 does not support the authenticate action or operation.

Some actions or operations may use one or more parameters when the action or operation is performed on the software package. When one or more parameter(s) is used, the plugin module 335, . . . 340 may generate a parameter list to be presented to an administrator or user. The administrator or user may enter the one or more parameters to be used in performing the desired action or operation. Examples of such parameters may include, but are not limited to, an account number, an identification of an authority contact, and/or one or more files that the software package is dependent on. If a required parameter is missing or is entered incorrectly, then the plugin module 335, . . . 340 may generate an error notification to notify the administrator or user that the required parameter has not been provided properly.

The embodiments of methods, systems, and computer program products described herein may provide a modular package management system that can evolve to accommodate new software packaging formats. The core module of the package management system may support software management, search, and administration for an operating system. Plugin modules may be added or removed to support or cease supporting various software packaging formats. Thus, a single package management system may support multiple software package types without the need to have separate installers or package managers for different software package types.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
   comparing a type associated with a software package comprising a plurality of files with a plurality of plugin types that are associated with a plurality of plugin modules;
   selecting one of the plurality of plugin types that supports the software package based on the type associated with the software package; and
   installing the software package on a data processing system using the one of the plurality of plugin modules associated with the selected one of the plurality of plugin types;
   wherein installing the software package comprises performing an action on the software package using the one of the plurality of plugin modules associated with the selected one of the plurality of plugin types,
   wherein the plugin types are ranked in an order of preference; and wherein selecting one of the plurality of plugin types comprises:
   determining that multiple ones of the plurality of plugin types support the software package; and
   selecting the one of the plurality of plugin types from the multiple ones of the plurality of plugin types that support the software package that has a highest rank in the order of preference.

2. The method of claim 1, wherein selecting one of the plurality of plugin types comprises:
   determining that multiple ones of the plurality of plugin types support the software package; and
   receiving user input identifying the selected one of the plurality of plugin types from the multiple ones of the plurality of plugin types that support the software package.

3. The method of claim 1, wherein performing the action comprises:
   receiving user input requesting that the action be performed; and
   performing the action on the software package responsive to a determination that the one of the plurality of plugin modules associated with the selected one of the plurality of plugin types supports the action.

4. The method of claim 1, wherein the action is a first action and the method further comprises:
  receiving user input requesting that a second action be performed; and
  generating an error notification responsive to a determination that the one of the plurality of plugin modules associated with the selected one of the plurality of plugin types does not support the second action.

5. The method of claim 1, wherein performing the action comprises:
  generating a parameter list identifying a parameter for performing the action; and
  performing the action responsive to a receipt of the parameter.

6. The method of claim 5, wherein the parameter list identifies a plurality of parameters.

7. The method of claim 6, wherein the plurality of parameters comprises one of an account number, an identification of an authority contact, and a file that the software package is dependent on.

8. The method of claim 5, wherein performing the action comprises:
  generating an error notification responsive to a determination that the parameter is one of incorrect and missing.

9. The method of claim 1, wherein the action is one of an identify operation, an install operation, a remove operation, an authenticate operation, an audit operation, and a list operation.

10. A system, comprising:
  a processor; and
  a memory coupled to the processor and comprising computer readable program code embodied in the memory that when executed by the processor causes the processor to perform operations comprising:
  comparing a type associated with a software package comprising a plurality of files with a plurality of plugin types that are associated with a plurality of plugin modules;
  selecting one of the plurality of plugin types that supports the software package based on the type associated with the software package; and
  installing the software package on a data processing system using the one of the plurality of plugin modules associated with the selected one of the plurality of plugin types;
  wherein installing the software package comprises performing an action on the software package using the one of the plurality of plugin modules associated with the selected one of the plurality of plugin types,
  wherein the plugin types are ranked in an order of preference; and wherein selecting one of the plurality of plugin types comprises:
  determining that multiple ones of the plurality of plugin types support the software package; and
  selecting the one of the plurality of plugin types from the multiple ones of the plurality of plugin types that support the software package that has a highest rank in the order of preference.

11. The system of claim 10, wherein selecting one of the plurality of plugin types comprises:
  determining that multiple ones of the plurality of plugin types support the software package; and
  receiving user input identifying the selected one of the plurality of plugin types from the multiple ones of the plurality of plugin types that support the software package.

12. The system of claim 10, wherein performing the action comprises:
  receiving user input requesting that the action be performed; and
  performing the action on the software package responsive to a determination that the one of the plurality of plugin modules associated with the selected one of the plurality of plugin types supports the action.

13. The system of claim 10, wherein performing the action comprises:
  generating a parameter list identifying a parameter for performing the action; and
  performing the action responsive to a receipt of the parameter.

14. A computer program product, comprising:
  a tangible computer readable storage medium comprising computer readable program code embodied in the medium that when executed by a processor causes the processor to perform operations comprising:
  comparing a type associated with a software package comprising a plurality of files with a plurality of plugin types that are associated with a plurality of plugin modules;
  selecting one of the plurality of plugin types that supports the software package based on the type associated with the software package; and
  installing the software package on a data processing system using the one of the plurality of plugin modules associated with the selected one of the plurality of plugin types;
  wherein installing the software package comprises performing an action on the software package using the one of the plurality of plugin modules associated with the selected one of the plurality of plugin types,
  wherein the plugin types are ranked in an order of preference; and wherein selecting one of the plurality of plugin types comprises:
  determining that multiple ones of the plurality of plugin types support the software package; and
  selecting the one of the plurality of plugin types from the multiple ones of the plurality of plugin types that support the software package that has a highest rank in the order of preference.

15. The computer program product of claim 14, wherein selecting one of the plurality of plugin types comprises:
  determining that multiple ones of the plurality of plugin types support the software package; and
  receiving user input identifying the selected one of the plurality of plugin types from the multiple ones of the plurality of plugin types that support the software package.

16. The computer program product of claim 14, wherein performing the action comprises:
  receiving user input requesting that the action be performed; and
  performing the action on the software package responsive to a determination that the one of the plurality of plugin modules associated with the selected one of the plurality of plugin types supports the action.

17. The computer program product of claim 14, wherein performing the action comprises:
  generating a parameter list identifying a parameter for performing the action; and
  performing the action responsive to a receipt of the parameter.

* * * * *